United States Patent Office 3,484,180
Patented Dec. 16, 1969

3,484,180
VAT DYE DISPERSIONS
Victor T. Humphreys, Jersey Shore, and Joseph Bianco, Lock Haven, Pa., assignors to American Aniline Products, Inc., a corporation of Delaware
No Drawing. Filed Apr. 14, 1965, Ser. No. 447,951
Int. Cl. D06p 1/22, 1/02, 1/74
U.S. Cl. 8—34                    2 Claims

ABSTRACT OF THE DISCLOSURE

A non-migrating vat dye dispersion is provided that comprises 1–30 percent by weight of a vat dye comminuted to particle size of less than five microns, dispersed in water with a conventional dispersing agent, and 0.01–1 percent by weight, based on the weight of the dispersion, of methyl cellulose, a protective colloid. The non-migrating character of the dispersion is achieved by comminuting the vat dye to its ultimate particle size in the presence of the methyl cellulose.

---

Vat dyes in the crude, unstandardized form are conventionally obtained as a press cake which must be ground to provide the finely-divided aqueous dispersions that are useful in dyeing processes. In the past it has been particularly difficult during grinding to control the lower limit of dye particle size with any degree of accuracy. In the dyeing operation known as pigment padding it is necessary to continue grinding until all or substantially all of the dye particles are reduced to a size of five microns or less. Since the dye particles vary considerably in original size and hardness, depending upon the particular color and its method of manufacture, the amount of grinding required to achieve the desired maximum five micron particle size also varies considerably. The physical variations in the dye particles thus result in the formation, after a standard grinding operation, of varying amounts of very finely-ground color of submicron size. During conventional pigment padding operations, dye particles of submicron size tend to move to the surface of the cloth during the drying step following initial padding, resulting in the objectionable effect known as "migration." Past attempts to eliminate or control migration by the addition of substances to the padding bath or by the use of undispersed or partially dispersed color particles to eliminate particles of submicron size have been either unsuccessful or too cumbersome and costly.

A successful effort in the control of migration is described by Clapp et al. in U.S. Patent 3,139,321. Clapp et al. eliminate or minimize migration by grinding the vat dye in the presence of 10–50 percent by weight, based on the weight of dry dye, of a cationic dispersing agent, i.e., a monomer-polymer mixture of a salt or a quaternary derivative of a dialkylaminoalkyl acrylate. Unfortunately, cationic dispersing agents of the type used by Clapp et al. are relatively expensive and large amounts of this material must be used to prevent migration. Surprisingly, we have found that if the initial grinding operation is carried out in the presence of a relatively small amount of methyl cellulose, the formation of submicron particles by overgrinding is markedly reduced or eliminated altogether. The resulting vat dye particles do not migrate when used in conventional pigment padding processes.

It is therefore an object of the present invention to provide novel vat dye dispersions that can be used in either batch or continuous pigment padding operations.

In accordance with the invention there is provided a non-migrating vat dye dispersion that comprises 1–30 percent by weight of a vat dye comminuted to particle size of less than five microns, dispersed in water with a conventional dispersing agent, and 0.01–1 percent by weight, based on the weight of the dispersion, of methyl cellulose, a protective colloid. The non-migrating character of the dispersion is achieved by comminuting the vat dye to its ultimate particle size in the presence of the methyl cellulose.

Vat dyes useful in the invention are colored organic compounds containing two or more keto groups.

that are capable of undergoing a reversible reduction-oxidation cycle without serious color change or loss of shade. On reduction with sodium hydrosulfite and alkali, there is formed the solubilizing leuco structure:

which has affinity for cellulosic fibers.

Generaly speaking, the vat dyes comprise the benzoquinones, naphthoquinones, acylaminoanthraquinones, benzanthraquinones, pyrenediones, anthraquinones, dibenzopyrenediones, pyranthrones, dibenzanthrones, polyisocyclicquinones, anthrimides, anthraquinonecarbazoles, anthrapyrazolones, anthraquinoneoxazoles, anthraquinonethioazoles, anthraquinoneimidazoles, anthraquinonethiophenes, anthraquinone oxadiazoles, pyridones, benzanthroneacridines, flavathrones, anthraquinoneacridones, anthrapyrimidines, pyrazines, anthraquinoneazines, anthraquinonetriazines, thiopyrans, thiaxathones, metoxazones, triazines, pyrans, diacridines, acridone/acridines, indigos, thioindigos, bis-benzimidazodiazapyrenediones, and azo-type vat dyes.

Specific useful dyes, as designated by the Colour Index, include CI Vat Green 3, CI Vat Blue 20, CI Vat Black 25, CI Vat Yellow 3, CI Vat Red 21, CI Vat Orange 3, CI Vat Violet 19, and CI Vat Brown 31.

The vat dye is present in the non-migrating dispersion of the invention in an amount ranging between about one and thirty percet by weight, usually between ten and twenty percent by weight, based on the weight of the dispersion. The dye is dispersed using any convenional dispersing agent in an amount ranging between 0.25–5 percent by weight, usually 0.5–1 percent by weight. Particularly good results are obtained using an anionic dispersing agent of the lignin sulfonic acid type, such as sodium lignin sulfonate. A series of lignin sulfonic acid dispersing agents are available commercially under the trademark "Marasperse."

The non-migrating vat dye dispersions of the invention are prepared by reducing the particle size of the vat dye to five microns or less by wet milling or grinding in the presence of 0.01–1 percent, preferably 0.1–0.2 percent, of methyl cellulose. Methyl cellulose is a white, cold-water-soluble powder made by the reaction of alkali cellulose with methy chloride to yield the methyl ether of cellulose. Ordinarily 1.5–2 of the three available hydroxyl groups of the individual glucose units of cellulose are etherified. Certain commercially available forms of methyl cellulose are substituted to a minor extent with hydroxypropyl groups. The viscosity of methyl cellulose as a two percent aqueous solution at 20° C. varies from about 10–18,000 centipoises. The preferred viscosity for use in the invention ranges from 100–1800 centipoises.

Methyl cellulose acts as a protective colloid during the grinding operation, and thus effectively prevents or retards the overgrinding of dye particles to submicron size. In addition, methyl cellulose has the unique and valuable property of being soluble in cold water, but insoluble in hot water. Thus, when a cloth which has been padded with the vat dye dispersions of the invention is heated during the conventional drying of the padded cloth prior to chemical fixation, the methyl cellulose is insolubilized to form a gel which effectively prevents migration of the dye particles in the water film on the fiber. If methyl cellulose is added to the dye dispersion after size reduction, migration is not eliminated.

The amount of methyl cellulose present during the grinding operation must be between 0.01 and one percent by weight, based on the weight of the standardized dispersion. If the amount used is less than 0.01 percent, the desirable results of the invention are not achieved. Amounts greater than one percent by weight produce a vat paste that is too viscous for practical purposes.

An effective method for milling or grinding the vat dye is that described in U.S. Patent 2,816,115. By this method, the vat dye is ground in the presence of water, dispersing agent, and a water-insoluble grinding agent, such as sand, until microscopic examination of test samples indicates that all or substantially all of the dye particles are less than five microns in size. By subjecting the mixture to milling under conditions that produce internal shear, the dye is ground to the desired size and the pigment is recovered as a dispersion free of grinding agent. Grinding is preferably done in a disc mill, such as that described in U.S. Patent 2,581,414. Alternatively, grinding can be done in a heavy-duty internal mixer fitted with sigmoid blades. A dough-like aqueous paste of vat dye containing the methyl cellulose is milled therein with internal shearing to reduce the particle size of the dye. Ball milling is also an effective way of achieving the desired particle size in the vat dye dispersions.

During grinding, the pH of the dispersion is adjusted to 8–10, preferably 8.5–9.0, to prepare it for subsequent use. The adjustment of the pH is conveniently accomplished by the addition of an alkali metal bicarbonate such as sodium bicarbonate.

In the conventional pigment padding processes of dyeing, mercerized goods are padded with a vat dye dispersed with an anionic dispersing agent. The goods are then dried and passed into a chemical pad bath containing sodium hydrosulfite and alkali to reduce the vat dye to its leuco form, which permits the dye to be absorbed on the fiber. By control of the drying conditions, the migration of the dye which occurs in drying can be controlled and an approach to level dyeing is attained. Using the non-migrating dispersions of the invention, level dyeings are obtained without rigid control of the drying conditions.

Pigment-pad wet processes in which the drying step is omitted have been inoperative, because of the excessive bleeding of the padded dye into the chemical pad bath, with the exception of the process of U.S. Patent 3,129,321, employing the expensive monomer-polymer mixture of a quaternary derivative of a dialkylaminoalkyl acrylate. Surprisingly, because of the insolubilization of methyl cellulose by strong alkali, the novel dispersions of the invention can be used without the customary drying step. Paddings made with the dispersions of the invention and introduced into the chemical pad bath without drying show no difference, when compared with dried paddings, in strength or shade on subsequent development of color, and no visible bleeding from the wet sample into the chemical pad liquor.

Our invention is further illustrated by the following examples.

EXAMPLE I

A double disc mill of the type described in U.S. 2,581,414 was charged with dye press cake; water; methyl cellulose, available commercially as Methocel MC (viscosity of 2% aqueous solution, 400 cps. at 20° C.); a sodium lignin sulfonate dispersing agent, available commercially as Marasperse NB; and sand, and operated until a filter test and microscopic examination showed that the color particles were effectively ground to below five microns in size.

The mill was first charged with press cake of CI Vat Green 3 (CI 69500), using 400 weight parts of press cake of approximately 22 percent dry test (100% color content). One hundred weight parts of water and 2.5 weight parts of Marasperse NB were added and the mixture was slurried up to break up the larger color lumps. Five weight parts of sodium bicarbonate was added to adjust the pH to between 8.5 and 9.0; 0.5 weight part of Methocel MC was then added. Sufficient sand was then added to act as the grinding medium and the mill was operated until effective dispersion and grinding of the color particles were attained. The sand was then removed from the paste by filtration and there was obtained a free-flowing, stable paste dispersion having a color content of approximately 18.50 percent.

EXAMPLE II

The vat dye dispersion of Example I was used in a conventional pigment padding operation, and there was obtained a substantially non-migrating pigment padding, which gave excellent level and bright color development on being processed in the conventional manner. Furthermore, when a sample of the pigment-padded material was introduced directly into the caustic and sodium hydrosulfite chemical pad bath without the customary drying step, there was no visible bleeding of color into the chemical pad liquor, and equally strong, bright, and level dyeings were obtained on subsequent development of the color. These results were not achieved when the Methocel was added to the dispersion after the grinding step.

EXAMPLE III

CI Vat Blue 20 (CI 59800), having a particle size of less than five microns, was obtained as a paste containing approximataely 20 percent color by sand milling the dye in the presence of methyl cellulose, as described in Example I. An essentially non-migrating product was obtained using the conventional pigment padding method. When the dyeing was made by the continuous method described in Example II, no apparent bleeding or loss of strength was observed and an excellent, level, and bright dyeing was obtained.

EXAMPLE IV

CI Vat Blue 18 (CI 59815), having a particle size of less than five microns, was obtained as a paste containing approximately twenty percent color by sand milling the dye in the presence of methyl cellulose, as described in Example I. An essentially non-migrating product was obtained using the conventional pigment padding method. When the dyeing was made by the continuous method described in Example II, no apparent bleeding or loss of strength was observed and an excellent, level, and bright dyeing was obtained.

EXAMPLE V

CI Vat Black 25 (CI 69525), having a particle size of less than five microns, was obtained as a paste containing approximately 17 percent color by sand milling the dye in the presence of methyl cellulose, as described in Example I. An essentially non-migrating product was obtained using the conventional pigment padding method. When the dyeing was made by the continuous method described in Example II, no apparent bleeding or loss of strength was observed and an excellent, level, and bright dyeing was obtained.

If a continuous padding operation without an intermediate drying step between the color pigment padding and the chemical caustic/sodium hydrosulfite padding bath is used, it is advantageous, especially when heavy shades are desired, to add from 0.5 to 10 percent by weight of a salt, such as sodium chloride or sodium sulfate, to the chemical pad bath to reduce further any danger of color bleeding. In the continuous padding operation the novel vat dye dispersion of the invention is used in an amount of from about 0.01–5 parts by weight on a dry basis of the vat dye contained in the dispersion per 100 parts by weight of the aqueous medium comprising the pad bath.

We claim:

1. A non-migrating vat dye aqueous dispersion comprising 1–30 percent by weight of a vat dye comminuted to a particle size of less than five microns, said vat dye being dispersed in water at a pH of 8–10 by the action of 0.25–5 percent by weight of an anionic dispersing agent, and 0.01 to 1 percent by weight, based on the weight of said dispersion, of methyl cellulose, said vat dye having been comminuted in the presence of said methyl cellulose.

2. A non-migrating vat dye aqueous dispersion comprising 10–20 percent by weight of a vat dye comminuted to a particle size of less than five microns, said vat dye being dispersed in water at a pH of 8–10 by the action of 0.25–5 percent by weight of a lignin sulfonic acid dispersing agent, and 0.1 to 0.2 percent by weight, based on the weight of said dispersion, of methyl cellulose, said vat dye having been comminuted in the presence of said methyl cellulose.

References Cited

UNITED STATES PATENTS

| | | | |
|---|---|---|---|
| 1,719,944 | 7/1929 | Risse et al. | 8—91 |
| 2,090,511 | 8/1937 | Crossley et al. | 8—79 XR |
| 2,118,432 | 5/1938 | Gessler | 8—79 X |
| 3,156,520 | 11/1964 | Blaisdell | 8—91 |

GEORGE F. LESMES, Primary Examiner

B. BETTIS, Assistant Examiner

U.S. Cl. X.R.

8—58, 79, 91